US012616629B2

(12) United States Patent
Paine

(10) Patent No.: US 12,616,629 B2
(45) Date of Patent: May 5, 2026

(54) LINE TRACKING CANE FOR THE VISION IMPAIRED

(71) Applicant: Alan Paine, San Dimas, CA (US)

(72) Inventor: Alan Paine, San Dimas, CA (US)

( * ) Notice: Subject to any disclaimer, the term of this patent is extended or adjusted under 35 U.S.C. 154(b) by 348 days.

(21) Appl. No.: 18/221,382

(22) Filed: Jul. 12, 2023

(65) Prior Publication Data

US 2023/0414441 A1 Dec. 28, 2023

Related U.S. Application Data

(63) Continuation-in-part of application No. 18/213,867, filed on Jun. 25, 2023, now abandoned.

(60) Provisional application No. 63/355,585, filed on Jun. 25, 2022.

(51) Int. Cl.
*A61H 3/06* (2006.01)

(52) U.S. Cl.
CPC ............. *A61H 3/061* (2013.01); *A61H 3/068* (2013.01); *A61H 2003/063* (2013.01)

(58) Field of Classification Search
None
See application file for complete search history.

(56) References Cited

U.S. PATENT DOCUMENTS

| | | | | |
|---|---|---|---|---|
| 2,870,427 A * | 1/1959 | Frank | A61H 3/061 | 324/226 |
| 3,546,467 A * | 12/1970 | Benham | G01S 17/48 | 342/24 |
| 4,071,297 A | 1/1978 | Leitz | | |
| 4,280,204 A | 7/1981 | Elchinger | | |
| 4,712,003 A | 12/1987 | Ban et al. | | |
| 4,996,468 A | 2/1991 | Field | | |
| 5,097,856 A * | 3/1992 | Chi-Sheng | G01S 7/4813 | 704/271 |
| 5,487,669 A | 1/1996 | Kelk | | |
| 7,267,281 B2 * | 9/2007 | Hopkins | A61H 3/061 | 434/112 |
| 7,778,112 B2 * | 8/2010 | Behm | G01S 17/93 | 367/910 |

(Continued)

FOREIGN PATENT DOCUMENTS

| | | | | |
|---|---|---|---|---|
| JP | 11016085 A * | 1/1999 | E01F 9/50 |
| JP | 3201482 U * | 12/2015 | |

OTHER PUBLICATIONS

PDF of machine translation of JP 11-01608 /H09-203716 (Year: 1999).*

*Primary Examiner* — Robert Canfield
(74) *Attorney, Agent, or Firm* — Kirk A. Buhler; Buhler & Associates Patenting

(57) ABSTRACT

Improvements in a line tracking cane for the vision impaired. The cane detects a line and notifies the user with a sound or vibration to indicate that is user is aligned with the line as the user passes the cane back-and-forth over the line. The detector can detect a direction of movement over the line to determine if the tip of the cane has completely passed over the line or has just moved half-way over the line. The cane is rechargeable and has a handle that orients the sensor on the tip of the cane to forward. The handle has an on-off or momentary power button. The cane can be collapsible as a folding cane or a telescoping cane. It is also contemplated that the tracking device can be an adapter for an existing cane to upgrade the functions of pre-existing cane.

19 Claims, 6 Drawing Sheets

(56) References Cited

U.S. PATENT DOCUMENTS

| | | | | |
|---|---|---|---|---|
| 8,467,674 | B1 * | 6/2013 | Ratner | F16M 13/08 396/429 |
| 10,639,228 | B1 | 5/2020 | Tavares et al. | |
| 10,765,588 | B2 * | 9/2020 | Yashiro | G06V 10/757 |
| 10,869,805 | B2 * | 12/2020 | Ng | A61H 3/066 |
| 2009/0032590 | A1 * | 2/2009 | Hopkins | A61H 3/061 235/385 |
| 2013/0113601 | A1 * | 5/2013 | San Luis | G01S 13/93 340/4.1 |
| 2013/0148190 | A1 * | 6/2013 | Taverner | G01J 3/02 359/341.1 |
| 2016/0184169 | A1 * | 6/2016 | Goszyk | G01S 17/93 250/341.8 |
| 2019/0307632 | A1 * | 10/2019 | Yashiro | G06V 10/757 |
| 2020/0368098 | A1 * | 11/2020 | Yashiro | G06V 10/757 |
| 2020/0405567 | A1 * | 12/2020 | Chen | G08G 1/005 |

* cited by examiner

LINE TRACKING CANE FOR THE VISION IMPAIRED

CROSS-REFERENCE TO RELATED APPLICATIONS

This application claims the benefit of Utility application Ser. No. 18/213,867 filed on Jun. 25, 2023 that claims priority to Provisional Application Ser. No. 63/355,585 filed Jun. 25, 2023 the entire contents of which is hereby expressly incorporated by reference herein.

PRIOR ART

U.S. Pat. No. 5,097,856 issued on Mar. 24, 1992 to Hsieh Chi-Sheng and is titled Electronic Talking Stick for the Blind. This patent discloses an electronic talking stick for the blind and more particularly to a stick which talks to instruct a blind man to walk and go upstairs and downstairs, and to warn a blind man of dangerous depression in road, and which calls for help when a blind man who uses the stick falls. It is generally comprised of a supporting rod, a control box, a handle, a free steering caster, and a horizontal scanning device, in which the free steering caster helps the whole assembly to slide; two detectors in the control box and a range finder and moving object detector in the handle are arranged for trouble detection to let detected signals be converted into voice, by means of the processing through a control circuit, to instruct the user through an earphone connected to the handle. This patent only detects objects or obstacles and does not track a line.

U.S. Pat. No. 5,487,669 issued on Jan. 30, 1996 to George F. Kelk and is titled Mobility Aid for Blind Persons. This patent discloses a mobility aid, for example a mobility aid handled in the manner of a flashlight, which allows a totally blind person to hand-scan, such as back and forth or up and down, the surrounding scene in order to hear the unbroken tonal phrases of varying frequencies which continuously indicate to the user the distance to, and, from the position of the hand, the position of objects and surfaces which make up the user's surroundings. While this patent discloses a cane for blind people it uses a laser sensor to detect objects as opposed to tracking a line on the ground.

U.S. Pat. No. 4,996,468 issued on Feb. 26, 1991 to Bruce F. Field et al. and is titled Automated Guided Vehicle. This patent discloses an unmanned, self-propelled vehicle in the nature of a mobile robot has an on-board computer that stores path and machine function instructions and activates the drive and steering systems so as to cause the machine to follow a desired path. A plurality of retroreflective targets is mounted along the desired path. An improved guidance system for keeping the vehicle on the prescribed path includes a laterally scanning laser transmitter-receiver mounted on the vehicle. An electromechanical tracking device controls the angle of elevation of the laser beam so as to keep it aimed at each target successively as the vehicle moves. While this patent discloses tracking a line, it is a self-propelled vehicle and is not a cane that passes back and forth over the line.

What is needed is a cane that can be used by a vision impaired person. The proposed line tracking cane for the vision impaired to allow the person to pass the tip of the cane back and forth over the line to track the line and detect changes in the ground.

BACKGROUND OF THE INVENTION

For a person that is visually impaired the most common tool is a cane that is moved back-and-forth over the ground to detect a change to the ground surface that may indicate a step, curb, or a drop-off. Some patents have added a radar system to the cane to detect overhead objects or walls. Still others have added some audible features to the cane to verbally instruct the person of objects in-front of the user.

SUMMARY OF THE INVENTION

It is an object of the line tracking cane for the vision impaired to track a line on the ground. The line can be applied to a street or a sidewalk so the user can determine if they a centered on the line as the user passes the cane back-and-forth over the line. The line can be a simple white or reflective line. It is also possible for the line to be painted and followed on a soft surface such as grass. The cane can vibrate or give an audible signal as the cane detects the tip of the cane moving over a line. The detector can also detect a direction of movement over the line to determine if the tip of the cane has completely passed over the line or has just moved half-way over the line and back. The optical sensor can have a light or a supplemental light to allow the cane to operate in low light or to conserve battery power when natural light is sufficient to detect the presence of a line.

It is an object of the line tracking cane for the vision impaired to use a photo sensor that can its own illumination source to detect the line in low light conditions. A single photo or laser sensor can be used, but multiple sensors can be used to detect a direction of movement over the line to determine if the cane is left or right of the line. The cane may also have a global positioning sensor (GPS) that tracks the location of the user and can provide audible instructions to guide the user to a particular location or if the person is heading in the wrong direction or off an alignment of the line.

It is another object of the line tracking cane for the vision impaired for the cane to have a handle that orients the sensor on the tip of the cane to forward. The handle has a button that allows the operator to turn-on or off the cane. The button can be a momentary button or a slide switch. With a momentary button, the cane can have a timeout feature that continues to keep the cane alive and detecting a line while the line is detected, or the cane is being moved. If no motion or line is not detected for a period of time the cane will self-power down to conserve battery power.

It is still another object of the line tracking cane for the vision impaired to be rechargeable and have an indicator for low battery. The cane can have a flashing light to warn others. The cane can be collapsible as a folding cane or a telescoping cane. It is also contemplated that the tracking device can be an adapter for an existing cane to upgrade the functions of pre-existing cane.

Various objects, features, aspects, and advantages of the present invention will become more apparent from the following detailed description of preferred embodiments of the invention, along with the accompanying drawings in which like numerals represent like components.

DETAILED DESCRIPTION OF THE INVENTION

Figure 1:
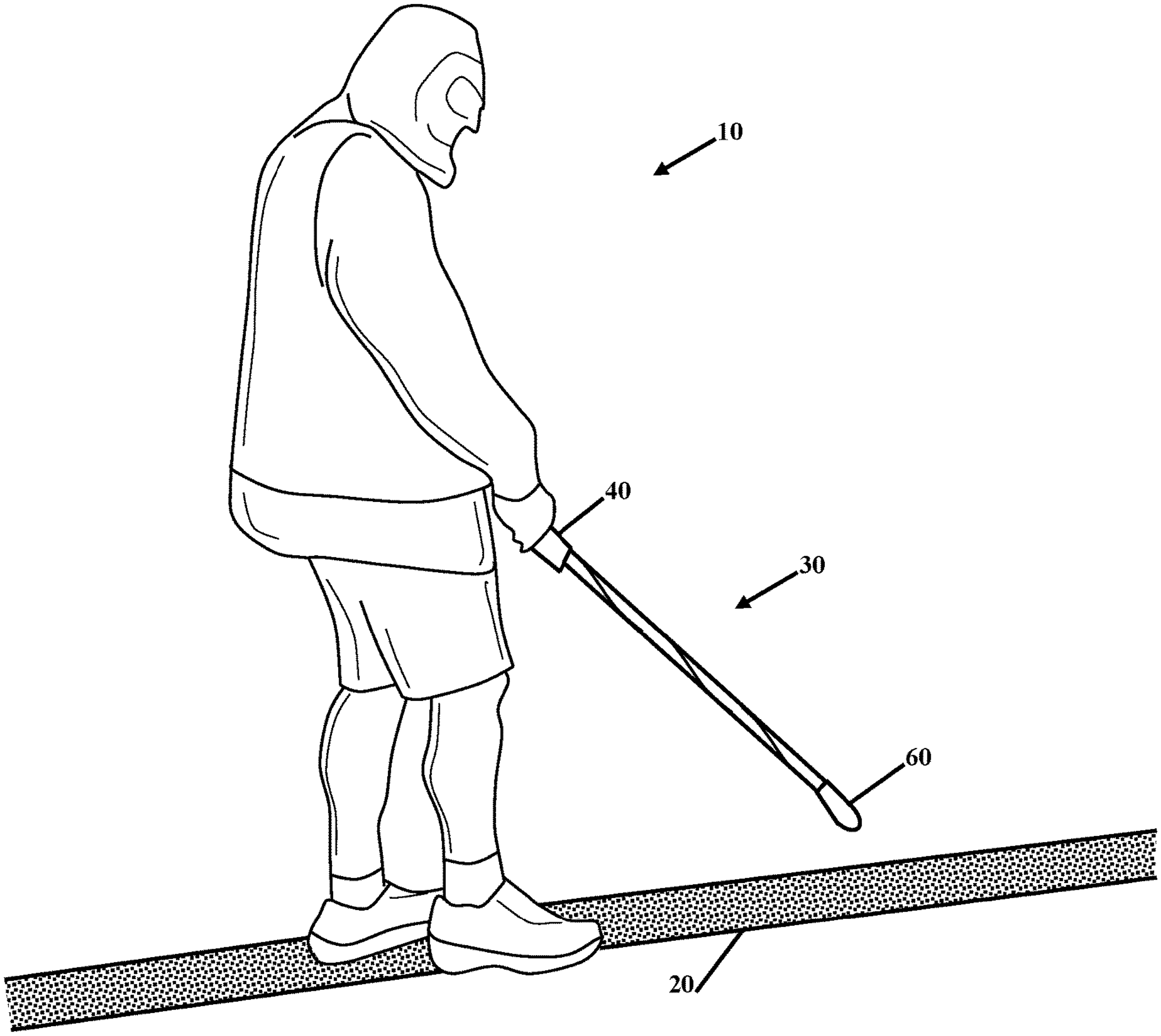
FIG. 1 shows a line tracking cane for a vision impaired user.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention but is merely representative of various embodiments of the invention. The illustrated embodiments of the invention will be best understood by reference to the drawings, wherein like parts are designated by like numerals throughout.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated. The terminology used herein is for the purpose of describing particular embodiments only and is not intended to be limiting of the technology. As used herein, the singular forms "a," "an," and "the" are intended to include the plural forms as well, unless the context clearly indicates otherwise.

It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof. It will be understood that like or analogous elements and/or components, referred to herein, may be identified throughout the drawings with like reference characters.

ITEM NUMBERS AND DESCRIPTION

| | |
|---|---|
| 10 vision impaired user | 20 reflective line |
| 21 secondary line | 22 "T" |
| 30 cane | 31 sleeve hole |
| 40 handle | 41 grip |
| 50 head | 51 body |
| 52 skirt | 53 clearance sector |
| 54 pocket | 55 sensor(s) |
| 59 cap | 60 cane tip |
| 61 cane reading head | 61A-61C moved cane head |
| 62 cane tip | 63 rotating tip |
| 64 fixed shaft | 65 hole |
| 70 control housing | 71 tab(s) |
| 72 charging lights | 78 filler housing |
| 79 tab(s) | 80 line detected |
| 81 line detected | 82 line gone |
| 83 line gone | 92 down |
| 93 down | 94 pass |

-continued

| | |
|---|---|
| 95 insert | 96 right-to-left |
| 97 right pass over | 98 left pass over |
| 99 right pass over | 100 controller |
| 101 battery | 110 charging pads |
| 120 button(s) | 121 LED |
| 122 buzzer/vibrator | 123 speaker |
| 130 emitter | 131 receiver |
| 132 receiver | 133 motion sensor |
| 140 GPS | 141 Bluetooth |
| 150 plug | 151 transformer |
| 152 charging pads | |

FIG. 1 shows a line tracking cane for a vision impaired user 10. In the simplest embodiment, a line or reflective line 20 is painted or otherwise marked on the ground. The line can be painted, but it could also be temporarily "tapped" onto the ground for a temporary or replaceable use. The user grasps a handle 40 of the cane 30. The handle 40 is configured with an orienting feature that allows the user to "feel" the upper and lower surface of the cane 30 to the cane tip 60 is properly oriented to view the ground and the reflective line 20 on the ground, floor, walkway, sidewalk, or road. The handle has a switch or sensor that will active the reflective line 20 detection and may turn itself off when the handle 40 is no longer being held or if there has been no reflective line 20 detection for a period of time.

The detection circuitry is configured to detect different levels of reflectivity. The reflectivity of the non-line can and does change based upon the age and weathering of the ground. In addition, the reflectivity of the line can and does change base upon age and weathering. Under use the detection circuit takes multiple samples of the surface to establish a baseline of an average reading for the level of light detection. When the sensor detects a sufficiently larger level of reflection the line is detected and announced. When the line is no longer detected then line announcing stops. Line announcing is with sound and or vibration.

The multiple baseline sampling occurs at a faster rate than the sampling of line detection. This is done to quickly accumulate a baseline reading in a non-line condition to continuously adapt to non-line reflection to fill a rolling average of the ground reflection. The rolling average of the ground reflection continues to sum and average both non-line and line conditions. When a line condition is detected, the summing slows down to not overflow the average with line reflection. If the detector stays on the reflective surface for an extended period of time the averaging can establish the base reflection at the reflection level of the line. Once the reflection level drops, the non-line base condition quickly accumulates. Slowing the sampling rate in an on-line condition also extends the notification time to the user as a sound and/or vibration.

Under some lighting conditions, ambient sunlight (or other artificial light may pass under the sensor. Under these conditions the emitter can be turned-off to determine if the sensor is flooded with ambient light or a highly reflective surface. If the emitter is turned off and the detector is still flooded with light then an error condition can be made that indicates the line can't be detected due to environmental conditions.

While a reflective line 20 is shown and described, the line can take other embodiments that can be detected from the cane tip 60. The sensor in the cane tip 60 can detect the reflective line 20 under most naturally or artificially illuminated ambient conditions, but the cane tip 60 can also have a laser, LED, or other form of illumination to supplement or replace ambient light. It is also contemplated that the reflective line 20 can be a color that is not visible to humans but can detected by an optical detector.

The cane 30 can be configured as an expandable (telescoping) cane, a foldable cane, or the handle 40 and cane tip 60 can be configured to mount on the user's existing cane. In use, the user will "sweep" the cane tip side-to-side as they walk to detect obstructions. As the cane tip 60 passed side-to-side over the reflective line 20 the handle 40 can send a vibration and/or an audible tone to indicate that the user is following the reflective line 20.

Figure 2:
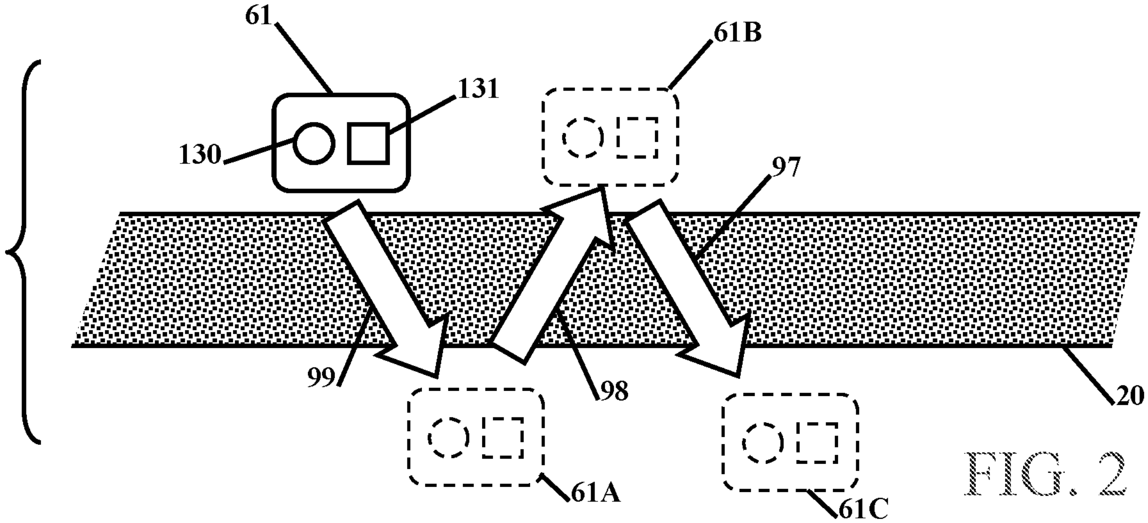
FIG. 2 shows a pictorial image of the cane reading heading passing over a line.

FIG. 2 shows a pictorial image of the cane reading heading passing over a line 20. In this preferred embodiment the cane reading head 61 is shown with an emitter 130 and a receiver 131 placed in a linear relationship with the reflective line 20. The cane reading head 61 is shown making a right pass over 99 the reflective line 20 to a moved cane head 61A position. As the sensor receive 131 detects the reflective line, the cane tip or the handle of the cane can emit a vibration and/or an audible should indicate the presence of the reflective line 20. As previously described, and the vision impaired user walks the will move the tip of the cane side-to-side. From the moved cane head 61A position the user will then "swing" or make a left pass 98 over the reflective line to the moved cane head 61B position. Again, as the cane passes over the reflective line 20 the user can detect a physical and/or audible signal that indicates that they are following the reflective line 20. The walking and motion of the cane head over the reflective line 20 is shown continuing as again the user makes the cane tip make a right pass 97 over the reflective line 20 to the moved cane head 61 position. This is a basic process and feed-back of the user and cane tracking the reflective line 20.

Figure 3:
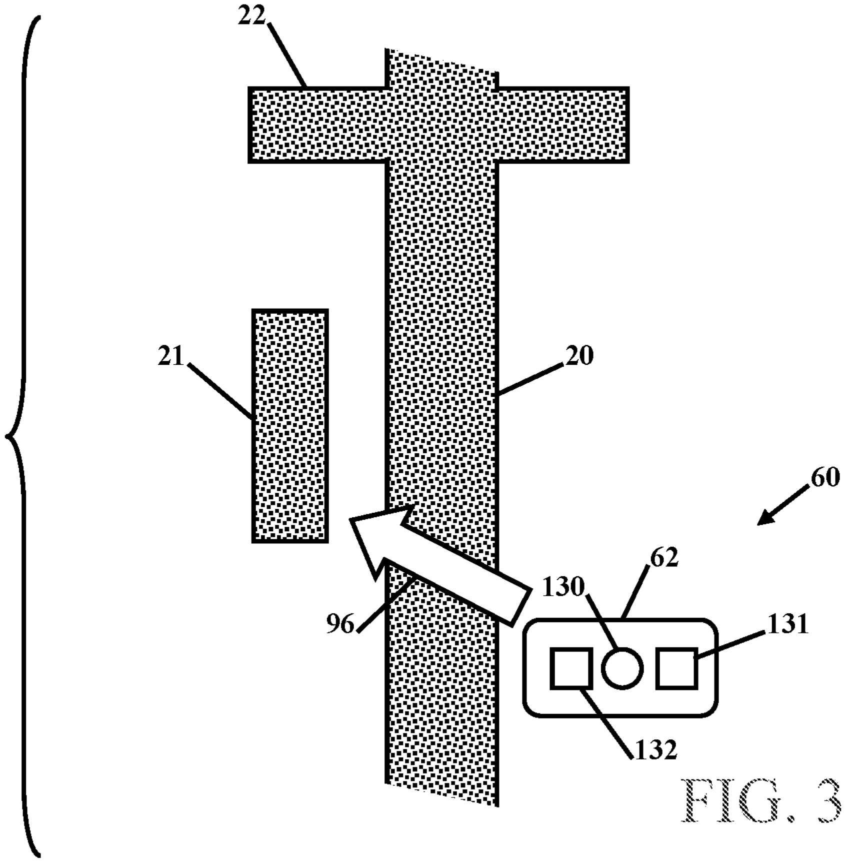
FIG. 3 shows another embodiment of the cane reading head passing over a line.

FIG. 3 shows another preferred embodiment of the cane tip 60 reading head passing over a reflective line 20. In the previous embodiment, if a user passes the detector half-way over the line, they will receive feedback from the cane, but once they drift off the line, the left or right displacement of the user to the line may not be obvious. This embodiment uses two receivers 131 and 132 placed on the outside of the emitter 130. This allows the cane to determine if the cane is on the left or right side of the reflective line 20. It is contemplated that passing the cane tip 62 over the reflective line 20 left-to-right verses right-to-left 96 could product different audible or tactile feedback so the user can detect if they have drifted.

This figure also shows a secondary line 21. Because the cane tip 62 includes two receivers 131 and 132, the cane tip 62 can determine that the user is tracking the reflective line 20 and the presence of a secondary line 21 to the left of the reflective line 20 can be used to notify the user that the sidewalk may have access to the left of the user by an audible and/or tactile response from the cane. This figure also shows a "T" 22 that can be used to notify the user that they are approaching an intersection or other potential obstacle.

Figure 4:
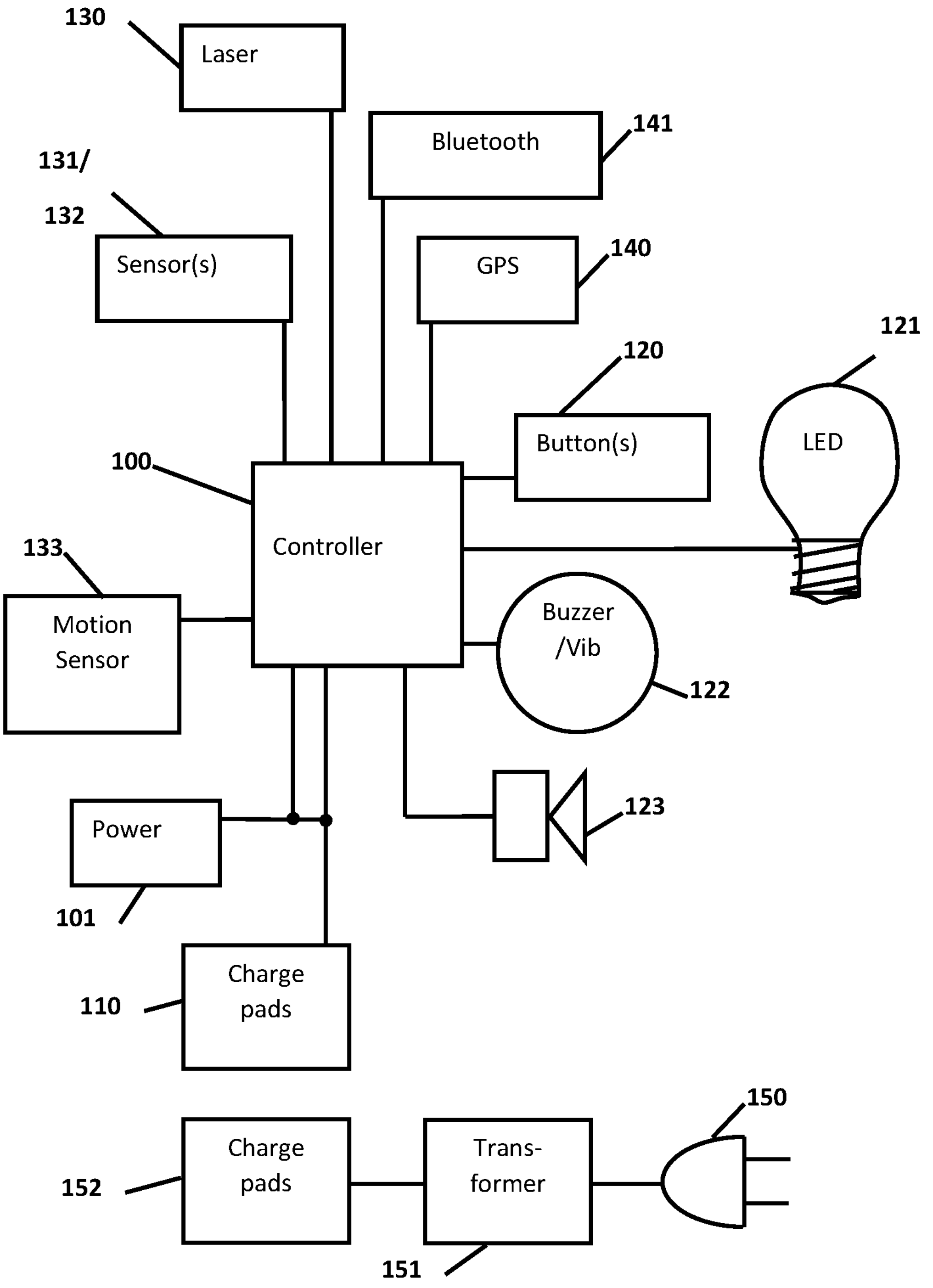
FIG. 4 shows a block diagram of the electrical components in the line tracking cane.

FIG. 4 shows a block diagram of the electrical components in the line tracking cane. In some embodiments the cane can be completely integrated in the cane, can be fabricated in a tip and separate handle that can be secured to an existing cane or can be just a tip adapter for an existing cane. In all embodiments, some, or all of the elements in the block diagram may be present. The cane can be a hard-wired embodiment of power 101 to a switch or button 120 wired to a vibration device 120 or speaker 123 through a light sensor 131. When the reflective line is detected by the light sensor it will cause vibration and/or sound from the speaker 123. Another advanced embodiment is also shown with a controller 100.

In this embodiment, the controller 100 is controls operation of the cane. A button 120 will wake the cane and begin sensing from the sensor 131 and in some embodiment's sensor 132. If insufficient ambient light is detected the controller 100 can illuminate the laser 130 or other supplemental illumination. A light emitting diode (LED) 121 or flashers that can also be energized for ground illumination or notify others about the vision impaired user. Power 101 is supplied by a battery that can be charged from an inductive charger or from charging pads 110 such as, but not limited to USB chargers from an external charging system of charging pads 152 from a transformer 151 that is connected to a plug 150 or outlet. The cane can provide charging level when a charger is installed by vibrating (and/or sound) one to four times (or more or less) or can providing the vibration (and/or sound) at time intervals of every minute or more to notify a blind user of the charge level.

The buzzer or vibrator 122 provides a tactile or physical notification that the cane has passed over the line. This provides a notification without others hearing sound. The notification of the cane passing over the line can also be from a speaker 123. The speaker can also provide other prompts. It is contemplated that the cane can have a connection to a cellular phone, tablet, or other device through Bluetooth 141 to program the cane for a specific set of directions. A global positioning sensor (GPS) 140 can determine the location of the cane and can provide audible instructions for turns through the speaker 123. The speaker 123 can also provide notification of a low battery or power 101 condition. This figure also shows a motion sensor 133 that can be used with one or more of the reflective line sensor(s) 131, 132 to determine if the cane is being moved side-to-side if no line is detected to identify that the line has been lost or other indicator.

In one embodiment the sensor 131 signal is received in the controller 100 in an analog to digital (A/D) port where the threshold level for line detecting detection can be adjusted. The detection level is adjusted based upon the reflected surface and non-reflecting surfaces. Ambient light can also affect the line detection level. The controller 100 can adjust the line detection level by changing the detection threshold in a dynamic process of measuring minimum and maximum signals from the sensor 131 to adjust the detection level over time or over an average of 2 to 100 (or more) minimum and maximum readings from the sensor 131.

Figure 5:
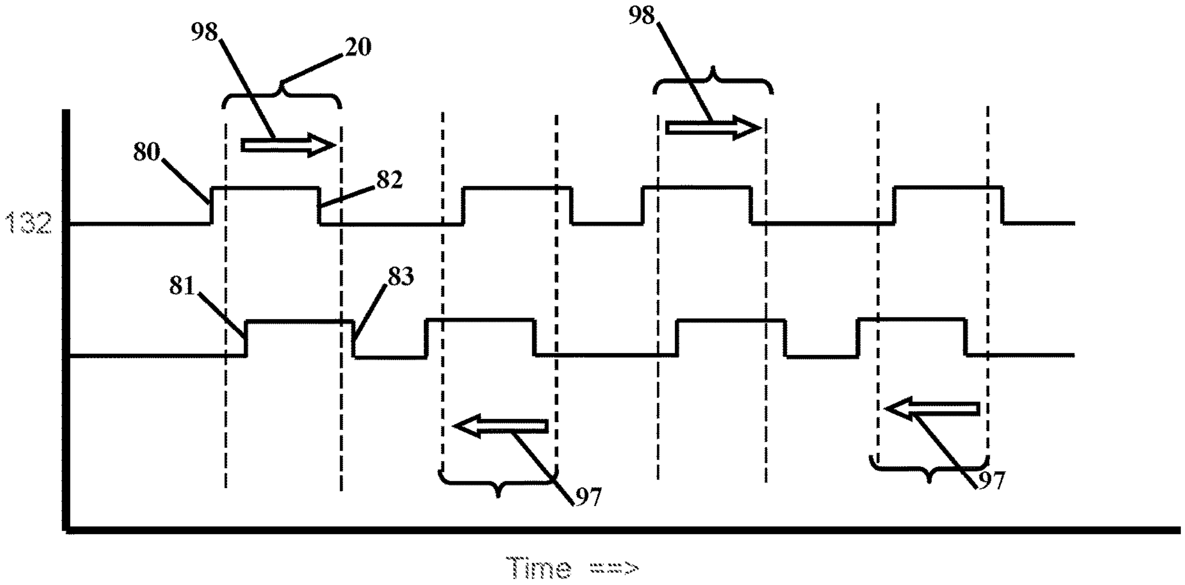
FIG. 5 shows a timing diagram of the sensors detecting a line.

FIG. 5 shows a timing diagram of the sensors detecting a reflective line 20. This diagram shows the output from two sensors 131 and 132 to show the detection of the reflective line 20 as the cane makes a left pass over 98 the reflective line 20 or a right pass over 97 the reflective line 20. As the cane makes a left pass over 98 the reflective line 20 first the line detected 80 is from the sensor 132 and then the line is detected 81 from the sensor 131. As the cane moves past the line, first the line is gone 82 from the sensor 132 and then the line is gone 83 from the sensor 131. The controller uses this information to ensure that there is no anomaly with the direction of travel of the vision impaired user. The information can also be used with the motion sensor and/or GPS data.

Figure 6:
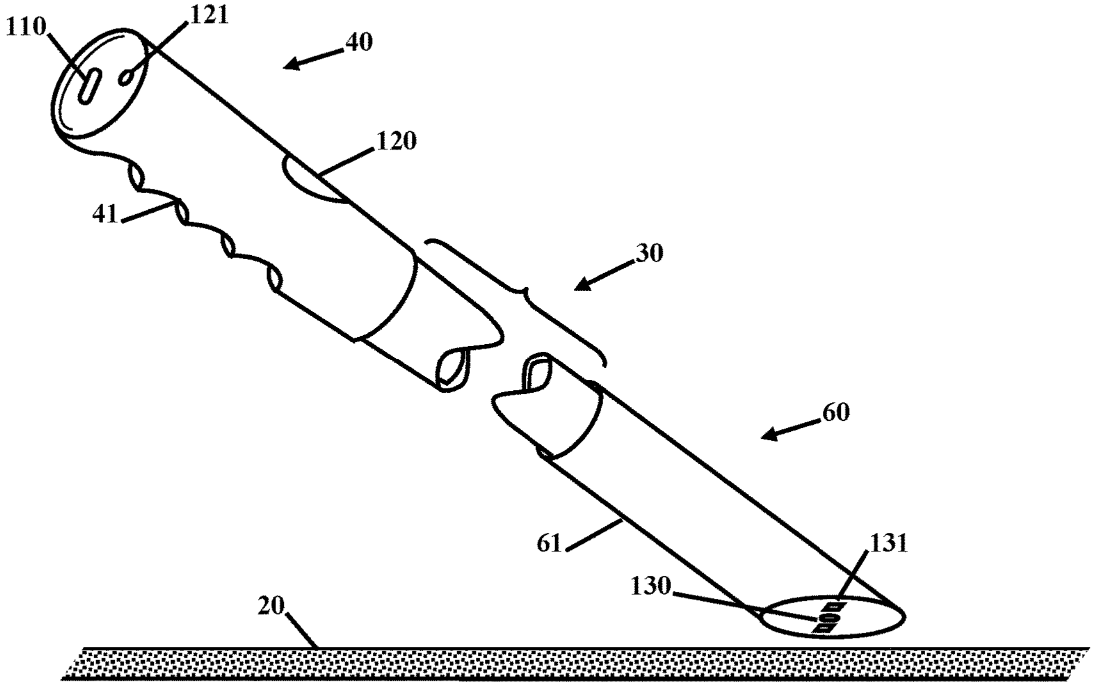
FIG. 6 shows an isometric view of the user parts of the line tracking cane.

FIG. 6 shows an isometric view of the user parts of the line tracking cane. In this figure the reflective line 20 is shown under the cane. The handle 40 is shown with a plurality of finger grip 41 features that allows a user to orient the cane, so the sensors are facing the ground or reflective line 20. There is a button 120 to power the electronics. The handle 40 shows an LED 121 indicator that the cane is being powered and charging pads 110 to recharge the cane. There is an electrical connection from the handle 40 to the cane tip 60 that runs along, within or is served around or within the cane 30 shaft. In this figure the cane tip 60 shows and can reading head 61 with an emitter 130 and one or more photo detectors 131, 132 that detect the presence of the reflective line 20.

Figure 7:
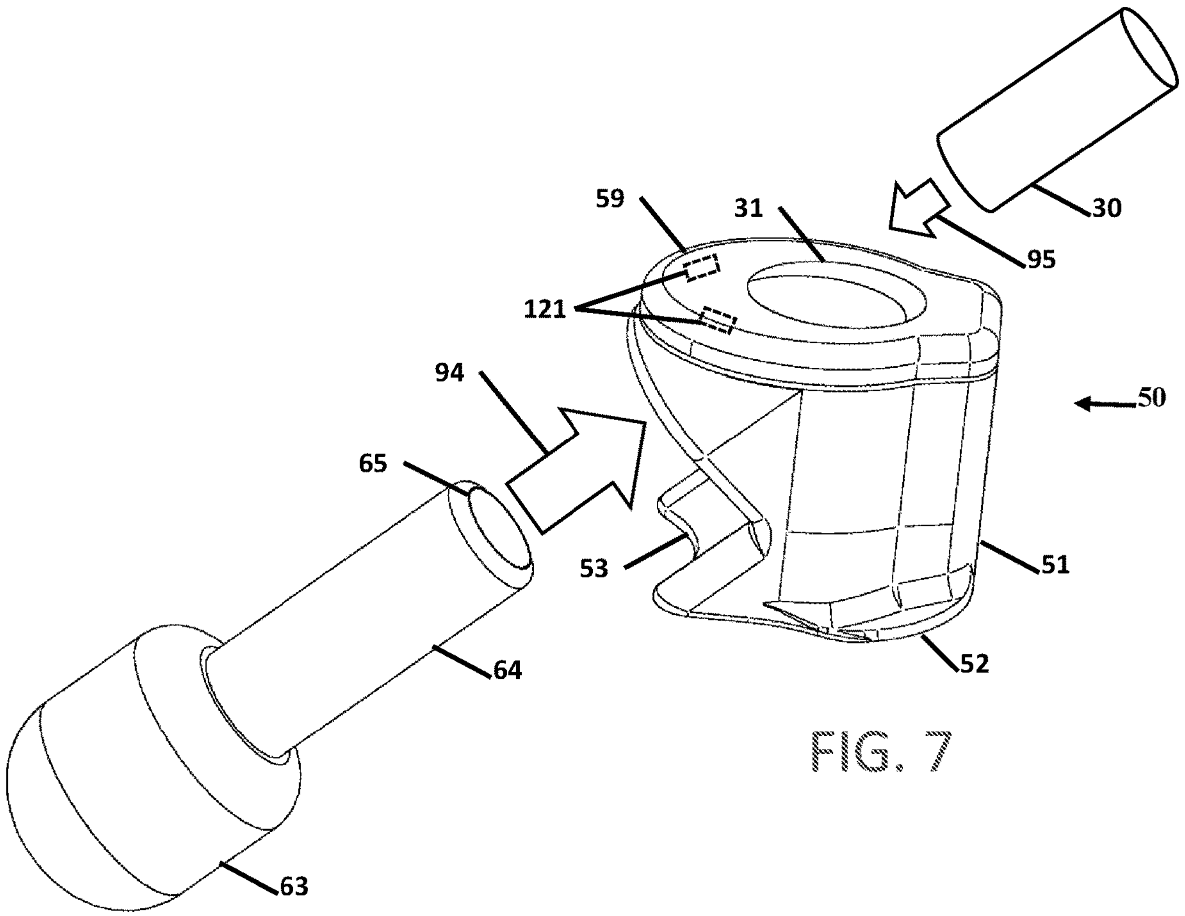
FIG. 7 shows a perspective view of a line detection head being fit onto an existing cane.
Figure 8:
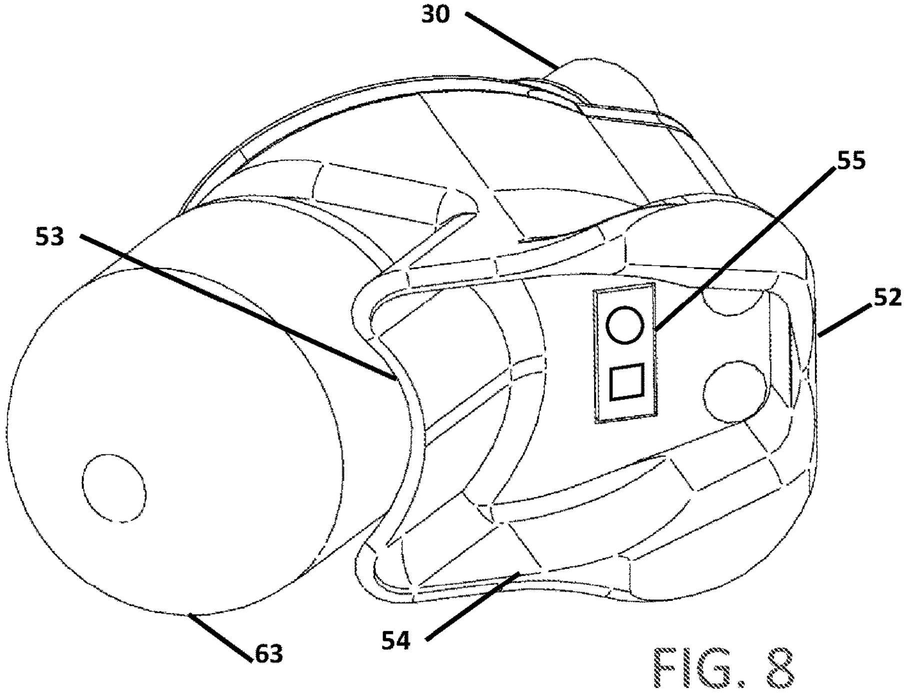
FIG. 8 shows the underside of the line detection head on the existing cane.

For some embodiments a user may have an existing can and the line detection device is retrofit onto the user's existing cane. FIG. 7 shows a perspective view of a line detection head 50 being fit onto an existing cane 30 and FIG. 8 shows the underside of the line detection head 30 on the existing cane 30. Most common canes use a rotating tip 63 that turns as the tip 63 rubs along the ground. The rotating tip 63 is connected with bearings to a fixed shaft 64 that slides onto the end of the cane 30 pole. In this embodiment the detection head 50 is installed around the fixed (replaceable) portion of that is secured into the cane 30 tip. The rotating head 63 and fixed shaft 64 is pulled off of the end of the cane 30.

The outside diameter of the fixed shaft 64 is passed 94 through the body 51 of the head 50 and out of the sleeve hole 31 that retains a friction fit onto the fixed shaft. The cane 30 end is then inserted 95 into the hole 65 in the fixed shaft 64 and retains the desired orientation. There is a clearance sector 53 radius that at least partially surrounds a portion of the rotating tip 63. The top cap 59 of the head 50 may be made of a transparent material so LED 121 lights can emit light to notify others.

From the underside there is a pocket 54 where the sensor(s) 55 are recessed based upon the focal length of the emitter and detector. A skirt 52 provides a shadow under the head 50 to reduce ambient light from entering under the head 50. Under some lighting conditions, ambient sunlight (or other artificial light may pass under the sensor. Under these conditions the emitter can be turned-off to determine if the sensor is flooded with ambient light or a highly reflective surface. If the emitter is turned off and the detector is still flooded with light then an error condition can be made that indicates the line can't be detected due to environmental conditions. A wired (not shown) or wireless connection connects the head to a control housing.

Figure 9:
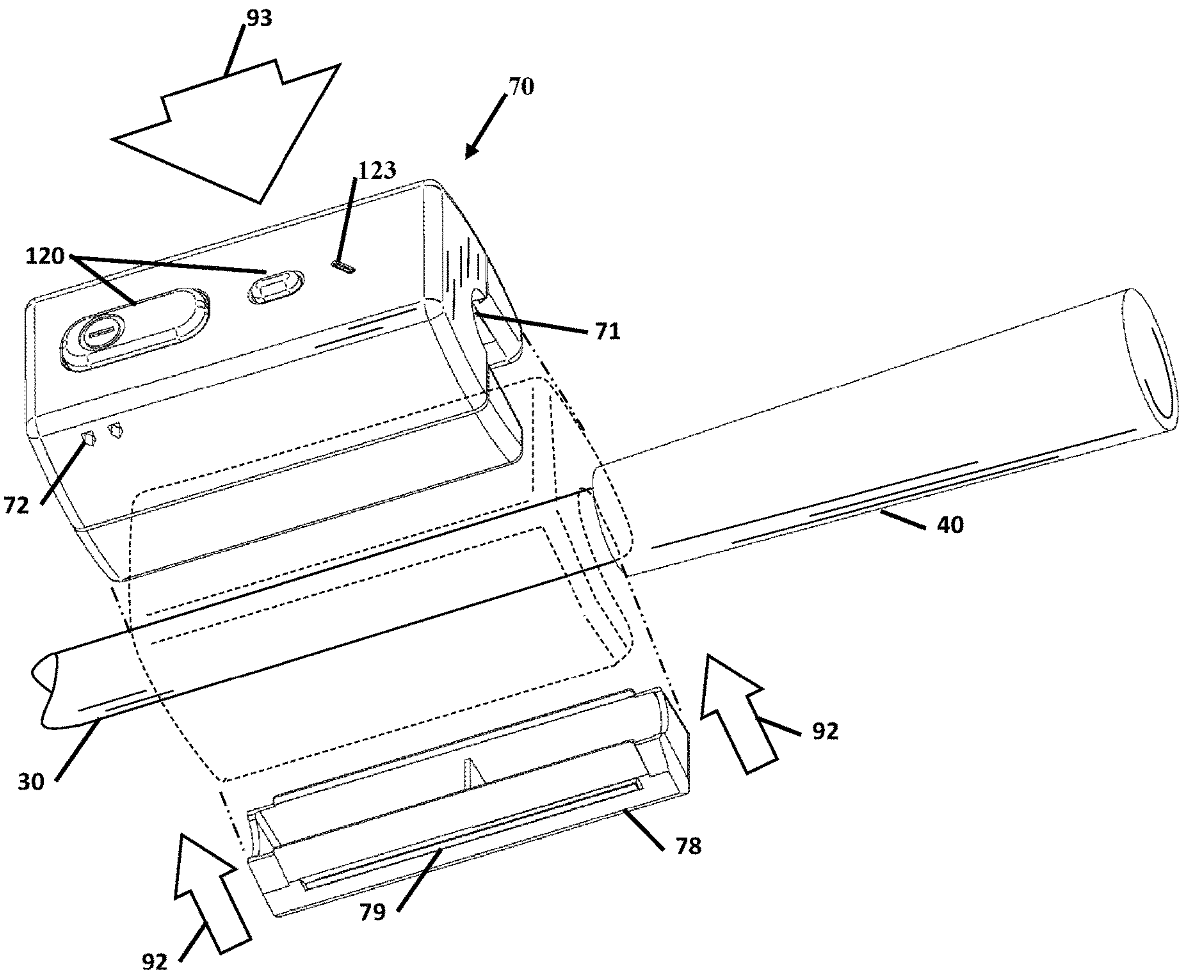
FIG. 9 shows the control housing being fit onto the existing cane pole.

FIG. 9 shows the control housing 70 being fit onto the existing cane 30 pole. The control housing 70 connects to the sensing head with a wireless or a wired (not shown) connection where the wire can be served around the cane 30 shaft or otherwise secured to prevent the wiring from drooping. The control housing has an open bottom slot with tab(s) 71 that are configured to "snap" or otherwise engage and secure the control housing 70 onto the cane 30 when the control housing 70 is brought down 93 onto the cane 30 shaft below the handle 40 grip. Buttons or controls on the control housing 70 allows a user to determine the orientation of the head 50 without visual or tactile confirmation of the orientation of the head 50.

The top of the control housing 70 has control buttons 120 to power the line detection unit on and off. There may also be an option button to modify sound, vibration or other functions. A slot allows for sound from a speaker 123 to pass outside of the housing. In the preferred embodiment a charger connects into the control head 70 and one or more charging lights 72 shows the status of charging the line detection control head.

The cane can provide charging level when a charger is installed by vibrating (and/or sound) one to four times (or more or less) or can providing the vibration (and/or sound) at time intervals of every minute or more to notify a blind user of the charge level. An optional filler housing 78 uses one or more tab(s) 79 that both center and lock into the bottom of the control housing 70. The filler housing 78 is brought down 92 into the bottom of the control housing 70. In the embodiment shown in these figures the line tracking device for a can be installed and removed from an existing cane without the use of tools.

Thus, specific embodiments of a line tracking cane for the vision impaired have been disclosed. It should be apparent, however, to those skilled in the art that many more modifications besides those described are possible without departing from the inventive concepts herein. The inventive subject matter, therefore, is not to be restricted except in the spirit of the appended claims.

The invention claimed is:

1. A line tracking cane for the vision impaired comprising:
- a cane having an optical sensor at a first end of said cane;
- said cane further having a power switch that is configured to power said optical sensor to detect a reflective surface;
- a vibration device connected between said optical sensor and said power whereby when said optical sensor detects said reflective surface, said vibration device is activated to produce a vibration to said cane and,
- a detection head that is wired to a separate control housing wherein said detection head is configured to be retained on a fixed portion of a rotatable tip.

2. The line tracking cane for the vision impaired according to claim 1, wherein said cane has a grip or handle at a second end of said cane that creates an orientation of said optical sensor.

3. The line tracking cane for the vision impaired according to claim 1, further includes an audible output device connected to said optical sensor.

4. The line tracking cane for the vision impaired according to claim 1, wherein said reflective surface is a line on a ground.

5. The line tracking cane for the vision impaired according to claim 1, wherein said optical sensor is connected to a micro-controller.

6. The line tracking cane for the vision impaired according to claim 5, wherein said optical sensor is connected to said micro-controller with an analog to digital sensor.

7. The line tracking cane for the vision impaired according to claim 6, wherein said analog to digital sensor provides different reflection levels received by said optical sensor.

8. The line tracking cane for the vision impaired according to claim 7, wherein said micro-controller has an accumulator that generates a rolling average for said different reflection levels.

9. The line tracking cane for the vision impaired according to claim 8, wherein said rolling average accumulates reading faster when said reflective surface reading is low.

10. The line tracking cane for the vision impaired according to claim 5, wherein said optical sensor has an emitter.

11. The line tracking cane for the vision impaired according to claim 10, wherein said emitter is configured to be intermittently turned on and off.

12. The line tracking cane for the vision impaired according to claim 11, wherein said emitter is turned off to determine if said optical sensor is receiving excessive ambient light.

13. The line tracking cane for the vision impaired according to claim 1, wherein said separate control housing includes at least a power on switch, a battery, a vibration motor and a charging port.

14. The line tracking cane for the vision impaired according to claim 13, wherein said vibration motor is configured to provide intermittent vibration based upon the charge level of said battery.

15. The line tracking cane for the vision impaired according to claim 1, wherein said detection head further includes an illumination function that illuminates at least a portion of said detection head.

16. The line tracking cane for the vision impaired according to claim 1, wherein said optical sensor includes an emitter and a detector.

17. The line tracking cane for the vision impaired according to claim 1, wherein said emitter is configured to be intermittently turned off to determine if said reflection is from said emitter or from ambient light.

18. The line tracking cane for the vision impaired according to claim 1, includes at least two detectors wherein an edge of said reflective surface is separately detected by each of said at least two detectors.

19. A line tracking cane for the vision impaired comprising:

a cane having an optical sensor at a first end of said cane;

said cane further having a power switch that is configured to power said optical sensor to detect a reflective surface;

a vibration device connected between said optical sensor and said power whereby when said optical sensor detects said reflective surface, said vibration device is activated to produce a vibration to said cane and, a detection head that is wired to a separate control housing wherein said detection head further includes an illumination function that illuminates at least a portion of said detection head.

* * * * *